US011880540B2

(12) United States Patent
Robinson

(10) Patent No.: US 11,880,540 B2
(45) Date of Patent: Jan. 23, 2024

(54) DIGITAL MARK-UP IN A THREE DIMENSIONAL ENVIRONMENT

(71) Applicant: Hewlett-Packard Development Company, L.P., Spring, TX (US)

(72) Inventor: Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/966,070

(22) PCT Filed: Mar. 22, 2018

(86) PCT No.: PCT/US2018/023790
§ 371 (c)(1),
(2) Date: Jul. 30, 2020

(87) PCT Pub. No.: WO2019/182599
PCT Pub. Date: Sep. 26, 2019

(65) Prior Publication Data
US 2021/0004138 A1  Jan. 7, 2021

(51) Int. Cl.
*G06F 3/00* (2006.01)
*G06F 9/00* (2006.01)
(Continued)

(52) U.S. Cl.
CPC .......... *G06F 3/04815* (2013.01); *G06F 3/011* (2013.01); *G06F 3/0482* (2013.01); *G06F 3/04842* (2013.01); *G06F 3/04845* (2013.01)

(58) Field of Classification Search
CPC .... G06F 3/04815; G06F 3/011; G06F 3/0482; G06F 3/04842; G06F 3/04845; G06T 2219/2004; G06T 19/20
See application file for complete search history.

(56) References Cited

U.S. PATENT DOCUMENTS 7,142,196 B1   11/2006 Connor et al.
8,866,841 B1 * 10/2014 Distler ............... G06T 11/60
                                                345/619
(Continued)

FOREIGN PATENT DOCUMENTS

WO   WO-2016164355   10/2016

OTHER PUBLICATIONS

Iris, "Instant Virtual Reality for Building Industry", Available at: https://irisvr.com/.
(Continued)

*Primary Examiner* — Kieu D Vu
*Assistant Examiner* — Anita D Chaudhuri
(74) *Attorney, Agent, or Firm* — Quarles & Brady LLP

(57) ABSTRACT

Examples disclosed herein relate to digital mark-up in a three dimensional (3D) environment. An example device for digital mark-up in a 3D environment includes a processor, a display for showing a view of the 3D environment, and a memory including instructions on the processor. When the memory stored instructions are executed on the processor, they cause the processor to generate an anchor point in response to an author input, wherein the anchor point includes a virtual location. When the memory stored instructions are executed on the processor, they cause the processor to generate a mark-up object associated with the anchor point, wherein the mark-up object includes mark-up dimensions, a virtual authoring location, and a selectable association that, in response to being selected, instructs the processor to adjust the view shown in the display to be a view from the virtual authoring location at the time the mark-up object was authored.

19 Claims, 9 Drawing Sheets

(51) Int. Cl.
*G06F 17/00* (2019.01)
*G06F 3/04815* (2022.01)
*G06F 3/01* (2006.01)
*G06F 3/0482* (2013.01)
*G06F 3/04842* (2022.01)
*G06F 3/04845* (2022.01)

(56) References Cited

U.S. PATENT DOCUMENTS

| | | | | |
|---|---|---|---|---|
| 8,872,854 | B1* | 10/2014 | Levitt | G06F 1/1686 345/633 |
| 2005/0116964 | A1 | 6/2005 | Kotake et al. | |
| 2009/0079732 | A1 | 3/2009 | Fitzmaurice et al. | |
| 2011/0279445 | A1 | 11/2011 | Murphy et al. | |
| 2013/0073998 | A1* | 3/2013 | Migos | G06F 40/106 715/776 |
| 2016/0283081 | A1 | 9/2016 | Johnston et al. | |
| 2017/0262418 | A1 | 9/2017 | Lopez | |
| 2018/0011965 | A1 | 1/2018 | Benjamin et al. | |
| 2018/0308289 | A1* | 10/2018 | Srinivasan | G06T 19/006 |

OTHER PUBLICATIONS

Jung, Thomas, et al. "Immersive redlining and annotation of 3D design models on the web." In Computers in Building, pp. 81-98. Springer, Boston, MA, 1999.
Matterport, "Be There (3D Camera + Cloud)" Available at: https://matterport.com/.
Sinem Guven et al: "A Hypermedia Authoring Tool for Augmented and Virtual Reality", New Review of hypermedia and Multimedia, vol. 9, No. 1, xp055421055, Jan. 1, 2003, pp. 89-116.
Stefan Maass et al: "Dynamic Annotation of Interactive Environments using Object-Integrated Billboards", Full Papers Proceedings / WSCG '2006, The 14-th International Conference in Central Europe on Computer Graphics, Visualization and Computer Vision 2006, Jan. 30-Feb. 3, 2006, vol. 14, XP055071946, 8 pages.

\* cited by examiner

700

DIGITAL MARK-UP IN A THREE DIMENSIONAL ENVIRONMENT

BACKGROUND

A display may show a three dimensional (3D) environment to a viewer. In an example, these environments can be interactive or view-only. Examples can include video games that have characters that can walk through a world. Another example is a virtual reality or augmented reality display of a location in the physical world. The display may be a computer, television, wearable technology, or other means of transmitting images for viewing, input, and interaction. The images displayed may respond to interactions with the displayed images. If the images displayed are changed by the input, these changes may be saved for future display or interaction.

DESCRIPTION OF THE DRAWINGS

Certain examples are described in the following detailed description and in reference to the drawings, in which.

DETAILED DESCRIPTION

This present disclosure relates to mark-up in three-dimensional (3D) spaces, where that mark-up is generated on a flat plane parallel to the plane of the display. The intended targets of referential markings, e.g. arrows, contained in this mark-up are liable to be misconstrued when viewed from a location other than the one at which the mark-up was authored. Further, if multiple mark-ups are present, a user intending to view them may take a different path through the space than that taken by the mark-up's author, resulting in the mark-ups being viewed out of order. Information can be lost if the mark-up has an order that relies on a comment before or after it such as "see next comment" or "see last mark-up" and the like.

The present disclosure relates to make mark-ups in a 3D environment. The techniques disclosed herein relate to generation and management of a mark-up object. The mark-up object disclosed, as well as the display of the mark-up object, allows an annotation made by an author to be communicated in the correct context to a viewer. For example, a mark-up object in a 3D environment viewed from an improper angle can change the meaning of the mark-up object. Accordingly, the present techniques disclose a way to ensure the proper context of mark-up objects are conveyed in a display.

Further, the present techniques disclose adjustments to the functioning of a computer that is displaying the 3D environment, where the adjustments enable navigation between views shown on a display. Specifically, the ability for a view to snap or jump from a first view to a second view, such as away from a current location to an authoring location for a mark-up object, allows the processor to reduce the amount of processing needed to render each displayed view between the two locations. As used herein, the term authoring location refers to the coordinate location and orientation in the 3D environment from which an author created an item such as a mark-up object or anchor point.

A viewer using the display may feel teleported as the view displayed can change instantly to an authoring location. This teleportation of view allows a decrease in processor wear and tear through reduced processing. The techniques disclosed herein further reduces power consumed by a display device through reduced time needed to correctly navigate, read and understand a marked-up environment. The adjustments to the functioning of the computer further include reduced time needed for a display to show transition images thus reducing wear on a display as well as the processor, battery, and any intermediate components of display including networking components transporting data to be displayed. These adjustments also apply with regards to the ability to jump or navigate between one view at the author viewpoint for a mark-up object and the author viewpoint from which a second mark-up object was created.

Figure 1:
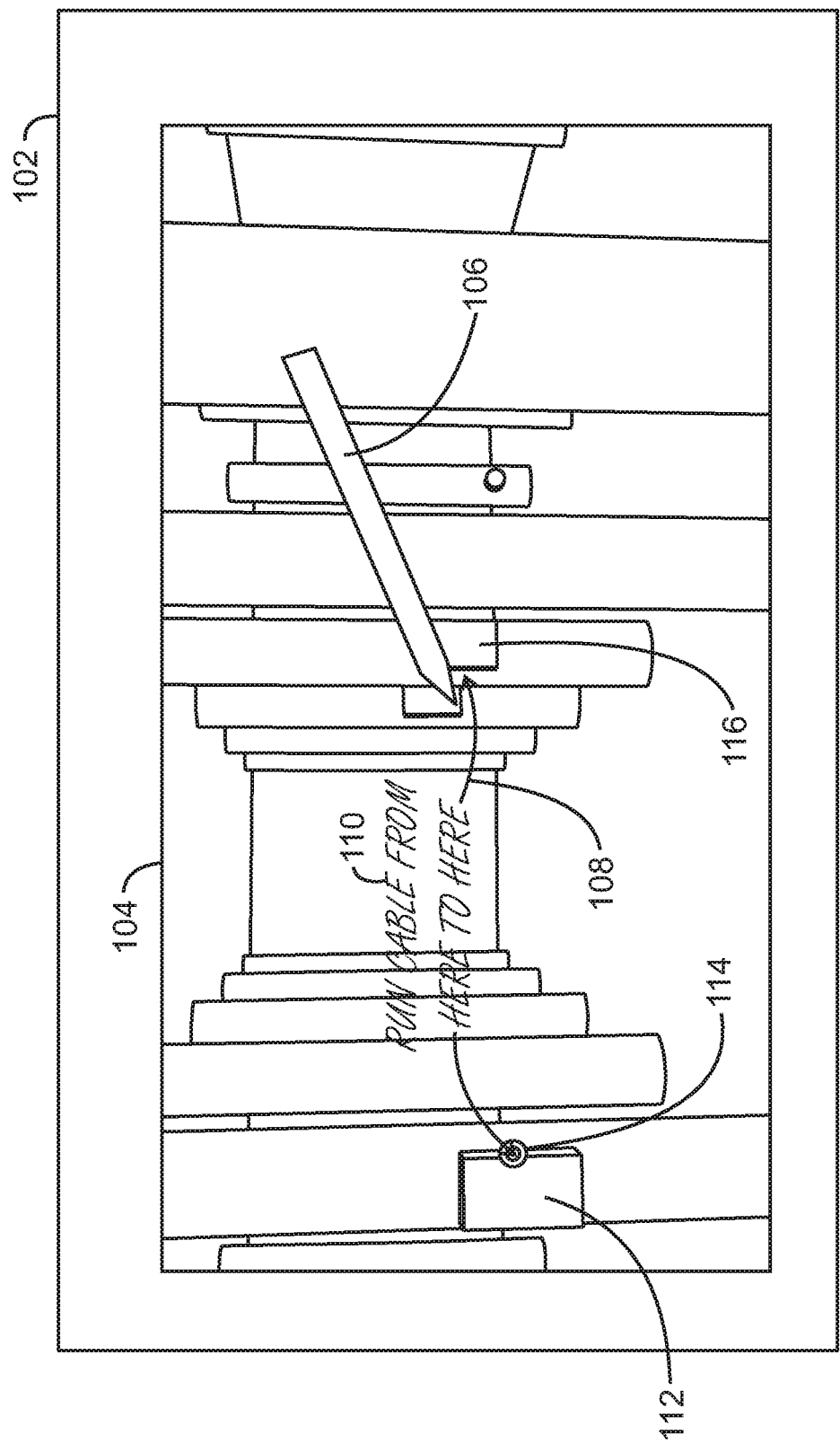
FIG. 1 is a drawing of an example display of a three-dimensional (3D) environment including a digital mark-up object being authored.

FIG. 1 is a drawing of an example display of a 3D environment including a digital mark-up object being authored 100. The display 102 may be a computer display, television set, wearable display such as glasses goggles, or projection for viewing. The display 102 may be a display for virtual reality or augmented reality. The display may show a view from an authoring location 104. As used herein, the view displayed may convince a viewer that they are located at a certain virtual location within the displayed 3D environment. This location may be virtual or in the cases of augmented reality may be tied to a physical location. A view from an authoring location 104 can include a coordinate location in the virtual X, Y, Z dimensions of the 3D environment as well as an orientation and scope of view that is shown on the display 102.

Shown in the display 102 may be an author input device 106. The author input device may be digitally displayed as a stylus, pointer, finger, hand, wand, tool, or other shape, symbol, or instrument to convey through the display the location of a digital input cursor. In an example, the author input device 106 may correspond to a physical device that may be held by a viewer or author to navigate or interact with the displayed 3D environment. The physical device that controls the author input device 106 may be a physical finger, hand, game controller, infrared transmitter, or other handheld controllers. The display of the author input device 106 allows a viewer to maintain a frequently updated knowledge of the location of where input may be placed in a 3D environment.

The authoring input device 106 may be used to generate a mark-up object 108. The mark-up object 108 may include mark-up text 110 to convey a message. The mark-up object 108 may be virtually created, located, and displayed with certain mark-up dimensions including size, orientation, coordinate location in the virtual 3D environment and other suitable visual dimensions including color, opacity, texture, shape, or animation. In order for the intended location of the mark-up object 108 to be maintained regardless of the view shown in the display 102, the mark-up object 108 may define its displayed dimensions including location and orientation relative to a first object 112 shown in the display 102. The first object 112 may be a visible item in the 3D environment or any point created by an author. In an example, the creation of an anchor point can be accompanied by a displayed symbol of the anchor point 114 shown on the display 102. The visualization of the anchor point 114 may assist in the maintenance of the mark-up object 108 as displaying an anchor point may allow a user to more easily locate and manipulate the anchor point 114.

During the creation of a mark-up object 108, the author input device 106 may begin by designation of an anchor point 114. This point defines a 2D plane in the 3D scene, parallel to the plane of the author's display, on which the mark-up is generated. The creation of the mark-up object 108 may also include reference to a second object 116, but is only physically connected to the initial anchor point. When a mark-up object 108 is created in 3D space, the location and orientation of the object may use reference to at least a first object 112 but also a second object 116 to identify a desired orientation of the mark-up object 108. In the example 3D environment shown in FIG. 1, the view from the authoring location 104 includes a room with a large number of vertical pillars reaching from the virtual floor to the virtual ceiling. The pillars are arranged in rows and columns throughout the room. In the example shown in FIG. 1, a first object 112 is shown as a box shaped item attached to a pillar and the anchor point 114 is indicated as being located in a specific position on the box shaped item. The mark-up object 108 includes a virtual display of arrows spanning from a first object 112 which is one pillar to a second object 116 shown as a box shaped item on a second pillar across a row and column of the virtual room. Between the arrows displayed in the mark-up object, there is text that reads "Run cable from here to here" indicating the two pillars that the arrows in the mark-up object 108 point to. If the mark-up object 108 rotated about its anchor point to remain oriented towards a viewer at all times, or was slightly askew, the meaning of the mark-up could be misinterpreted as indicating other pillars, for example, as described with respect to FIG. 3.

Figure 2:
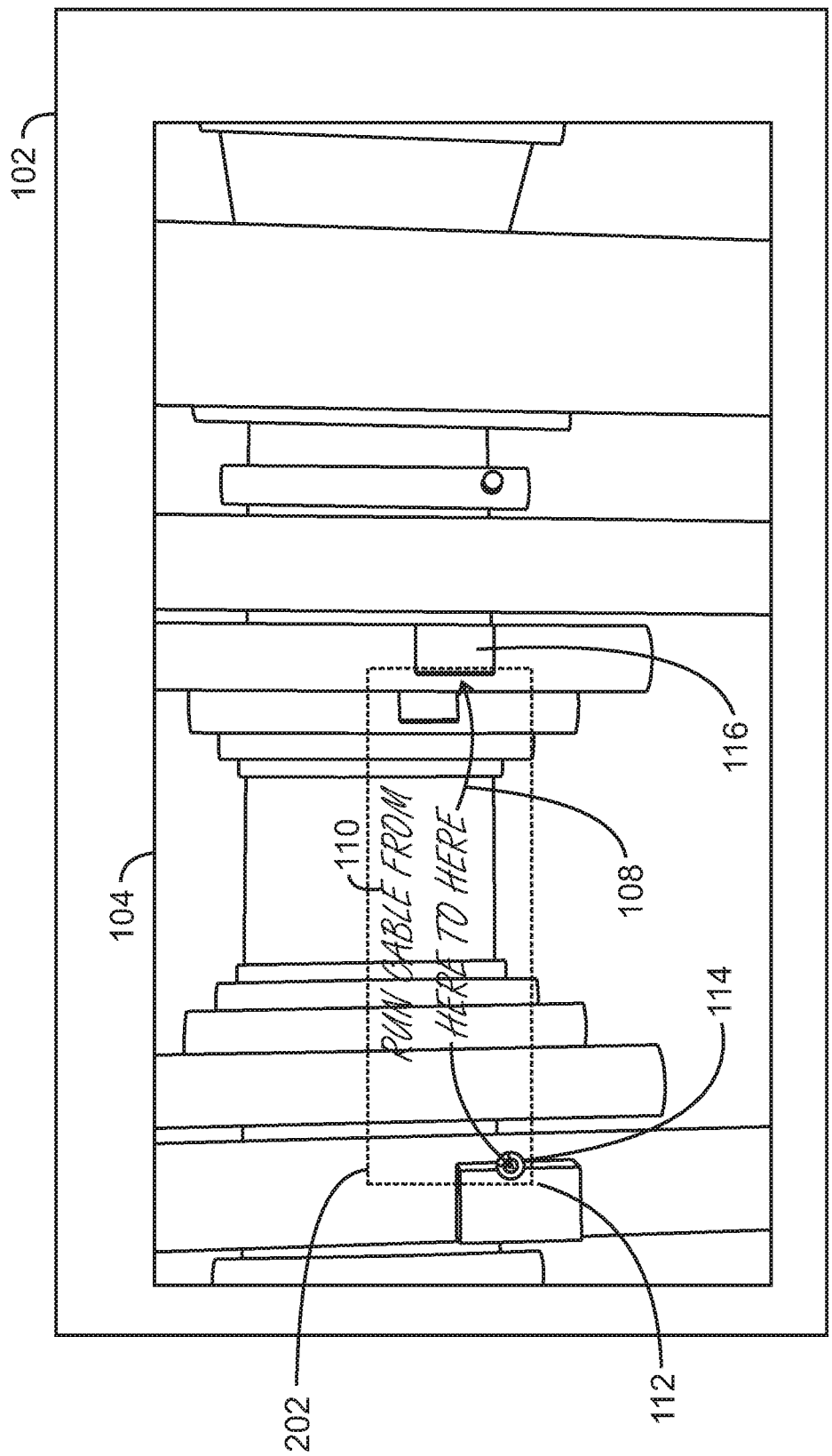
FIG. 2 is a drawing of an example display of a 3D environment including a digital mark-up object after authoring.

FIG. 2 is a drawing of an example display of a 3D environment including a digital mark-up object after authoring 200. Like numbered items are as disclosed with respect to FIG. 1.

Once an author has completed input to create a mark-up object 108, the mark-up object 108 may be shown in a mark-up object frame 202. In an example, the frame may be displayed as an outline boarder showing the size dimensions of the mark-up object. In an example, the mark-up object frame 202 can vary how translucent or opaque it is based on if it was created before or after other mark-up objects. In an example, the mark-up object frame may change color or opacity when viewed from an authoring location 104 in order to convey that the intended viewing location and orientation is currently being displayed by the display 102. In an example, a mark-up object frame 202 may have a first appearance of translucence or relative translucence when a view displayed is not from an authoring location. Further, the mark-up object frame 202 may change to a second appearance that is more opaque in response to a view being shown on a display from the authoring location. These are some examples of how a display may convey that the view being shown is the same as the author when the creating the mark-up object that has changed from a first appearance to a second appearance.

In an example, the mark-up object frame 202 can display a captured snapshot of the background behind the mark-up object 108 at the time the mark-up object 108 was authored. The snapshot may include the portion viewed through the mark-up object frame 202 or an entire screen shot of the view from the authoring location 104 at the time the mark-up object 108 was authored. The display of the captured snapshot of the context behind or around the mark-up object 108 may be 'behind the mark-up object' relative to the authoring location, e.g. a snapshot of the area further away from the authoring location than the mark-up object but in the same direction. In an example, the mark-up object may not display the captured snapshot unless the view being shown is a view from the authoring location 104. Alternatively, the captured snapshot may be displayed or not displayed based on the state of an historical image toggle located within the mark-up object frame 202. The historical image toggle, if included, would allow a viewer to show the captured screenshot of the context of the mark-up object when viewed from the authoring location 104. This toggling of the historical image toggle may assist in situations where the room or objects in the 3D environment have moved or changed since the time the mark-up object was authored. In addition to showing captured snapshots in the mark-up object frame, more complete context can be included in the display 102 including ghosted or semi-transparent objects viewable at the time of authoring overlaying a current state of the 3D environment. Rather than a ghosted display of a past 3D environment, a full image screenshot may be shown when toggled from an authoring location.

Figure 3:
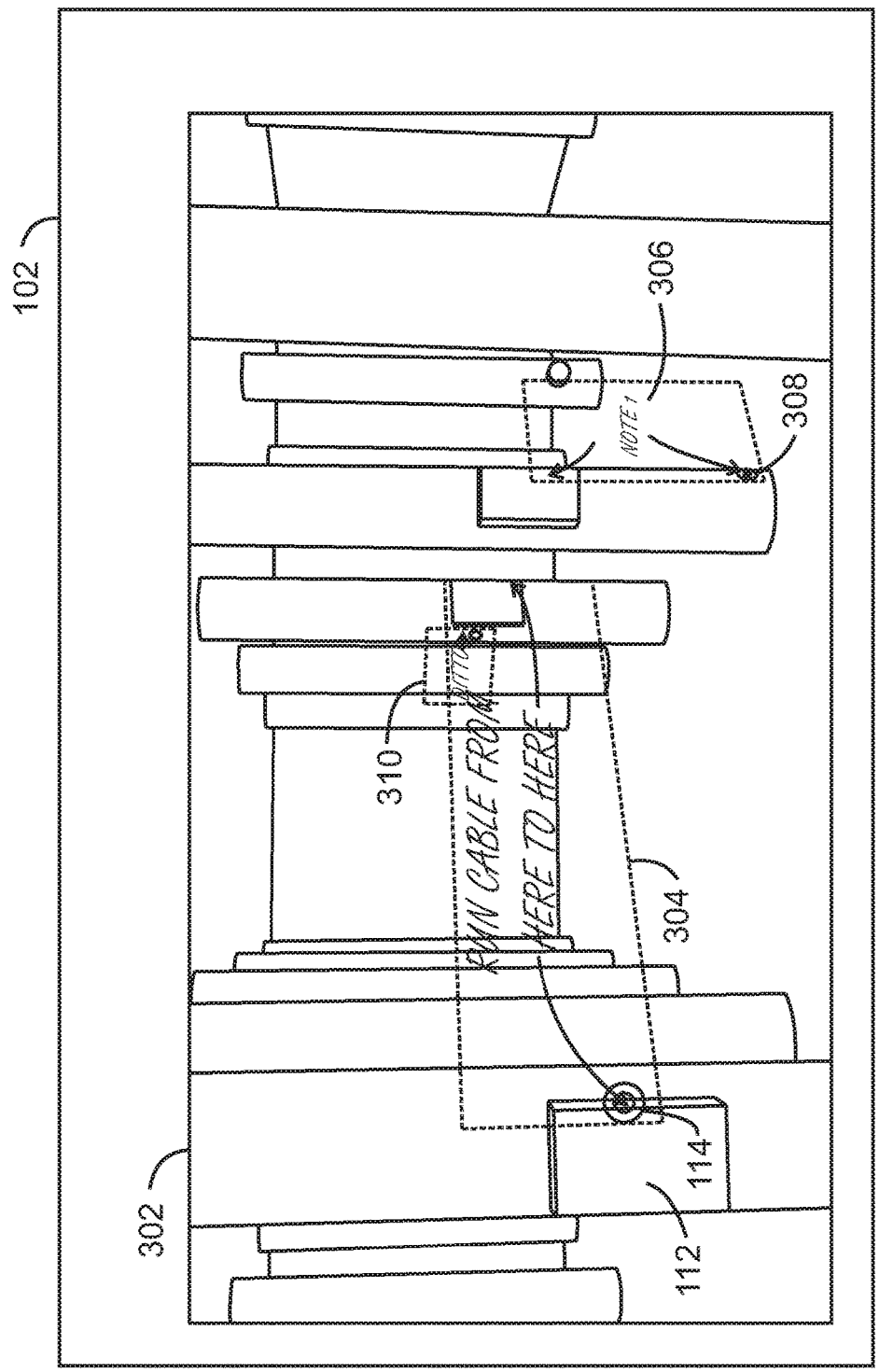
FIG. 3 is a drawing of an example display of a 3D environment including several mark-up objects viewed from a location other than authoring locations.

FIG. 3 is a drawing of an example display of a 3D environment including several mark-up objects viewed from a location other than authoring locations 300. Like numbered items are as disclosed with respect to FIG. 1.

The display 102 is showing a view from a location other than an authoring location 302. In the particular view shown in FIG. 3, the location and view orientation being shown on the display 102 has changed relative to FIG. 1 and FIG. 2. Additionally, more than one mark-up object is now shown. The mark-up objects have been rotated about their anchor points so as to be tilted in appearance relative to a flush presentation through the view of the display 102.

A tilted first mark-up object 304 is shown in the display 102 which is the same mark-up object 108 from FIG. 1 but is shown in FIG. 3 in a second appearance to indicate that the mark-up is not being viewed from the authoring location, specifically the mark-up object has been rotated about its anchor point to tilt away from the viewer. In an example, the tilting may be sufficient to indicate a change has occurred such that a view from an authoring location is no longer being shown. The tilting of the tilted first mark-up object 304 may also be limited to a degree that the text or drawings shown in the mark-up object may still be legible to a human eye. In an example, the tilting can be at least 15 degrees about a vertical rotational axis anchored at the anchor point 114. In an example, the tilting can be at least 30 degrees about a vertical rotational axis anchored at the anchor point 114. In FIG. 3, the tilted first mark-up object 304 shows how the change in appearance as well as the view from a location other than authoring location 302 can affect how the mark-up object may be interpreted. For example, the phrase "run cable from here to here" which in FIGS. 1 and 2 pointed towards a box-shaped item on two spate pillars now maintains an anchor point 114 position. The opposite end of the tilted first mark-up object is shown pivoted away from the second object 116 box shaped item of FIGS. 1 and 2 and now is shown pointing at another pillar altogether. Accordingly, the tilting of the mark-up object 108 should be sufficient in the manipulation and transformation of the mark-up object to indicate to a user that the mark-up object is not being viewed in an intended view. The tilting or other change in appearance of the mark-up object or mark-up object frame may signal through the display that an intended virtual location has been reached or has not yet been reached.

FIG. 3 further shows a tilted second mark-up object 306 attached to a pillar at a second anchor point. The text in this example, tilted second mark-up object 306 reads "Note 1". FIG. 3 further shows a tilted third mark-up object 310 behind the tilted first mark-up object 304. Each of these mark-up objects were authored at a point in time when a display 102 or computing device received input indicating the location and substance of a mark-up object. At the time each mark-up object was authored, the view shown on the display can be recorded and stored with the mark-up object. Accordingly, when a view is shown on the display 102 that does not match the authoring location stored in each mark-up object, then the mark-up object may be shown as tilted or altered in appearance in another way as discussed herein. These adjustments of appearance can indicate through the view of the display 102 that the view of the mark-up objects could change to show the mark-up objects in their proper context.

Figure 4:
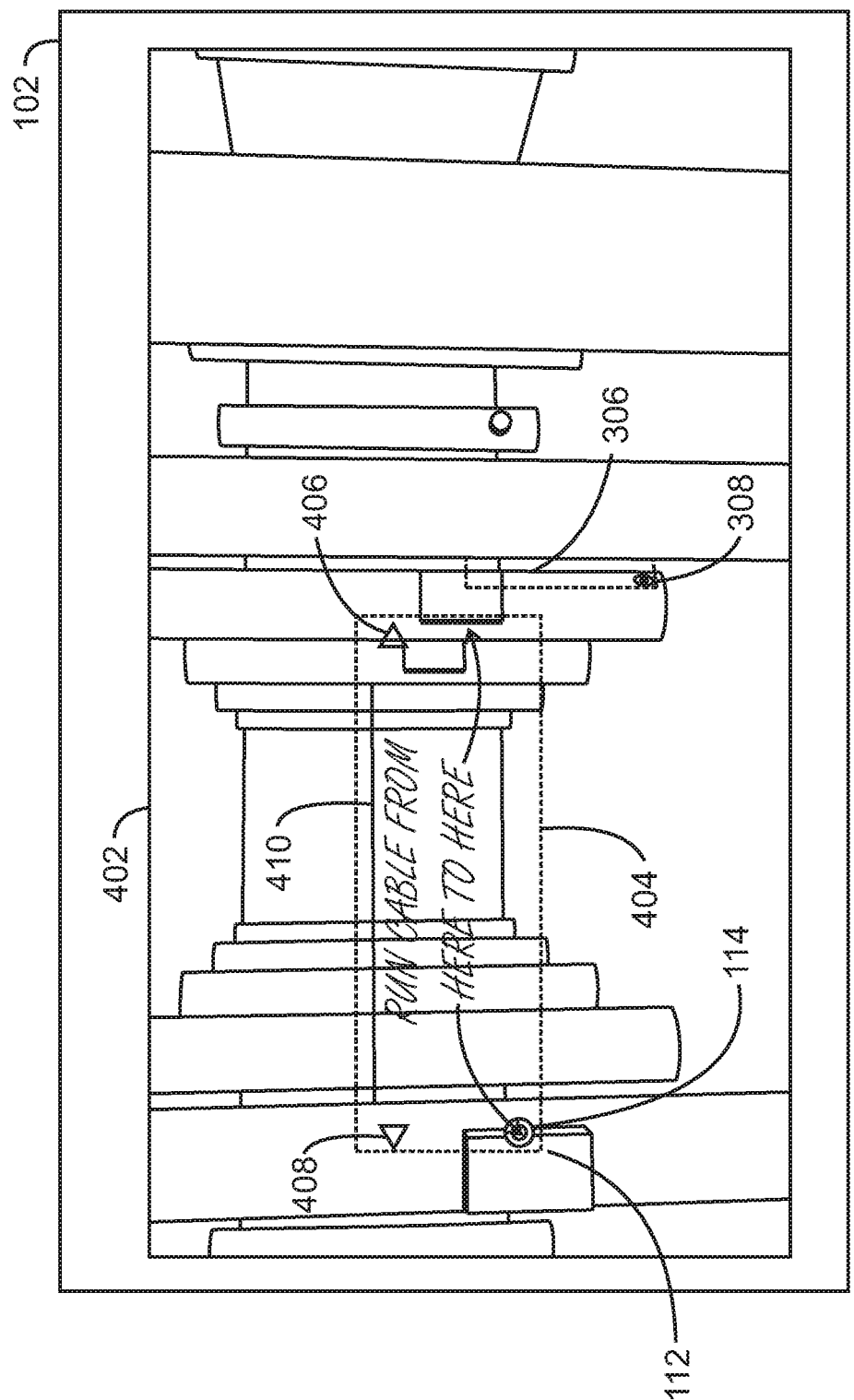
FIG. 4 is a drawing of an example display of a 3D environment focused on a mark-up object being viewed from an authoring location.

FIG. 4 is a drawing of an example display of a 3D environment focused on a mark-up object being viewed from an authoring location 400. Like numbered items are as disclosed with regard to FIG. 1 and FIG. 3.

In an example display 102, a selection may be made to adjust the view to display a view from a first authoring location 402 associated with a first mark-up object 404. In an example, the selection may be a selection of a selectable association through a button or icon shown on the mark-up objects. As used herein, the term selectable association can refer to a link including or similar to a hyperlink following a uniform resource locator protocol. The selectable association may be a selectable area of the display 102 that when selected provides a tag or bookmark to a computing device that returns a coordinate location and orientation in the 3D environment being displayed that the view may adjust to.

The adjustment of view may appear as though a view has teleported from a first virtual location to a view from a first authoring location 402. This adjustment of view can eliminate the need to generate intermediate image frames for views to be displayed between the first location and the view from a first authoring location 402 thus saving processing, power, and display element wear and tear. Additionally, the view adjustment can save time and increase the precision with which a location and orientation for viewing a first mark-up object 404 can be achieved.

In examples for virtual reality displays, a user may be stationary and an immediate image adjustment from one location to another may be appropriate. The techniques disclosed further include examples for augmented reality where a user may be moving in a physical world that is augmented by a digital 3D environment. In these examples, an adjustment of view may include the appearance of a guidance path to guide the location and orientation of a user view toward the first mark-up object 404.

Once a view is shown from a first authoring location 402, the first mark-up object 404 may change from a first appearance of either tilting, translucence, sizing, or coloration to a second appearance of being flush with the display 102. The change of appearance can ensure a viewer that the view being shown allows the mark-up to be viewed as intended and that any indications by the mark-up are viewed in their intended context. In the example shown in FIG. 4, the first mark-up object indicates two box shaped items on two separate pillars that a cable will be run between. In the appearance shown from the first authoring location 402, the arrows indicate the first object and second object as the author originally indicated during the creation of the mark-up object.

As the view can be adjusted from a virtual location to the view from a first authoring location 402, mark-up objects can include navigation tools of their own to navigate between the mark-up objects and showing the mark-up objects from their respective authoring views. In the example of FIG. 4, the first mark-up object includes a selectable forward navigation button 406 and a selectable backwards navigation button 408. As used herein, the concepts of navigation buttons being forward or backwards refers to navigation between mark-up objects based on their order of creation by an author. In an alternative context, the ordering of forward and backwards may relate to a manually ordered set of mark-up objects where moving forward in a set follows a manually created order of intended mark-up objects to be displayed. This ordering is helpful in conveying a helpful flow of viewing mark-up objects. In an example, ordered mark-up may be helpful in creating presentations, tours of virtual reality buildings and objects such as museums, video game walkthroughs and tutorials for virtual and augmented reality, and other suitable applications.

As discussed above, the adjustment of a view, including upon selection of a selectable forward navigation button 406 or selectable backwards navigation button 408 can adjust a view as though through teleportation from a first view to a second view. Alternatively, in an augmented reality setting where a user may actually be moving in a physical world, a path and suggested orientation of view may also be shown on the display 102.

The first mark-up object 404 may also include an authoring location indicator 410. As shown in the example of FIG. 4, this can be a horizontal line spanning the first mark-up object 404 however many other indicator styles are contemplated including coloration change of the mark-up objects, opacity of the mark-up objects, symbols displayed in or out of the frame of the mark-up objects, sounds being projected through a sound system, a haptic feedback provided to a user, and any other suitable indication that a view is showing a mark-up object from an authoring location. The indicator provides an indication that the view being shown, whether teleported to or manually arrived at, is the same location and orientation an author had during the creation of the mark-up object. Although FIG. 4 shows one example, changes in appearance of a mark-up object can be changes in angle of the mark-up object, changes in size, changes in opacity, changes in color, addition of elements, display or non-display of text.

In an example, mark-up objects may or may not be occluded by other objects in the 3D environment such that they may be visible in a viewer display even if they are currently behind an object in the 3D environment. In an example, mark-up objects are not bound by the same perspective scaling as the 3D environment they are attached to, and may instead be rendered at the same physical size as originally authored. Alternatively the scaling with distance could vary from an original size for closer objects to a minimum size as set by a system to improve legibility even from across a long virtual distance that would otherwise scale the annotation to an undetectable or inscrutable size. This scaling of mark-up objects to offset the usual perspective shrink-with-distance effect can be controlled by a scale factor determined by the range of distances of visible comments.

Figure 5:
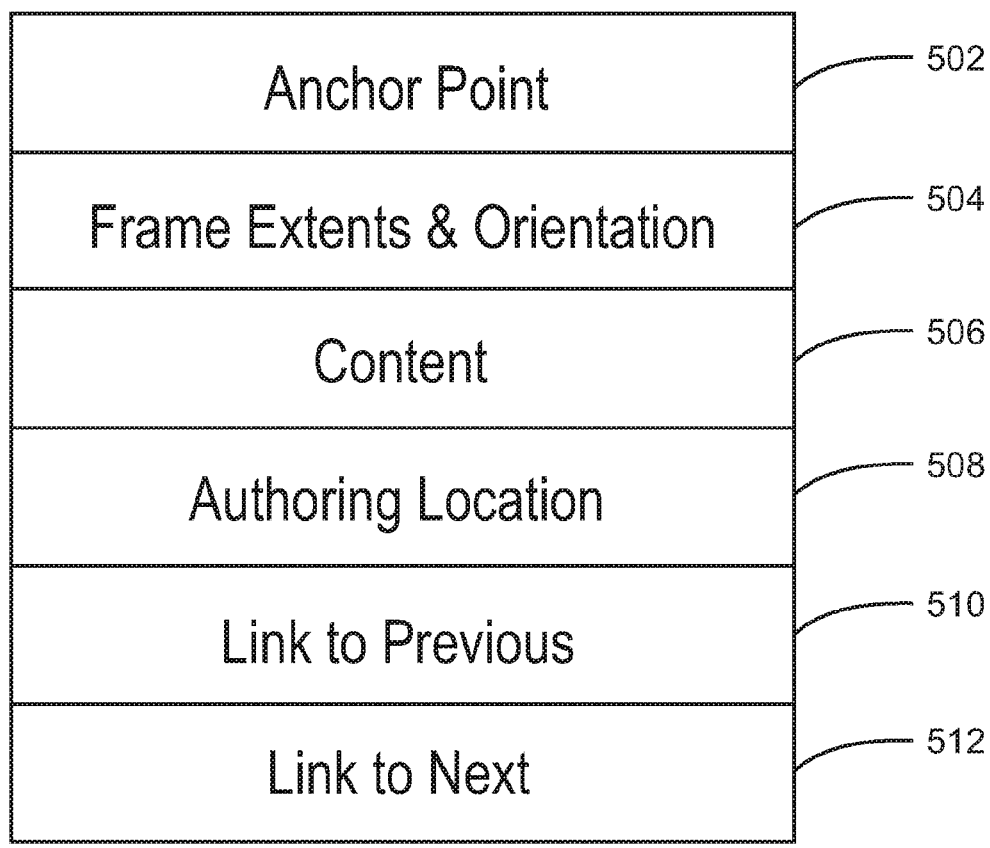
FIG. 5 is a block diagram of an example mark-up object including both displayed and non-displayed components.

FIG. 5 is a block diagram of an example mark-up object including both displayed and non-displayed components 500. The collection of the elements shown may be collectively referred to as the mark-up object although a few may or may not be shown in a display 102.

A mark-up object can include an anchor point 502. As discussed above the anchor point may include a coordinate location of a 3D environment indicated by author input. The anchor point may also be associated with a symbol or mark indicating the location of the anchor point in the view shown in the display. The anchor point provides a pivot point around which a mark-up object may tilt or change in size or shape while maintaining a connection.

The mark-up object may also include frame extents and orientation 504. In an example the extents of a mark-up frame can vary in size, shape, color, and dimensions. These extents may be determined by the author, be based on default settings of a 3D environment, or may be limited in size or shape by pre-existing settings of a system. The frame extents may also be used to enclose other settings and information of the mark-up object. The orientation of the object refers to the orientation at which the object is shown on a display. As discussed above, depending on the view location being shown on a display, the mark-up object may be shown in differing angles or appearances. For example, the orientation of the mark-up object may be rotated when a view is not shown from the authoring location of the mark-up object.

The mark-up object may also include content 506. In an example, the content 506 can be arrows, text, colors, premade tabs, a voice recording, a video file to be played upon the view being from an authoring location, the triggering of an action in another area of the 3D environment, or a free hand drawing within the frame extents of the mark-up object. The content 506 may be transformed with a change in view point of the mark-up object such as when the frame extents and orientation 504 of the mark-up object may change.

The mark-up object may also include an authoring location 508. As discussed above, the authoring location 508 may include a coordinate location in the virtual 3D environment, an orientation of a view being shown, or both. The authoring location 508 is individual to each mark-up object created as the authoring location may also be associated with a particular location in time at which the mark-up object as was created.

The mark-up object may also include a link to previous 510 or link to next 512. As discussed above, these directions are example conventions indicating a possible jump in location displayed from a first mark-up to a second mark-up and back. This can continue on for a third mark-up object and beyond depending on the number of mark-up objects shown. In an example, the order of mark-up object can be based on the time of creation by an author, time of last modification, time of last access, or a manually indicate order of the mark-up objects. In some examples, a mark-up object may be associated with an image captured of the scene at the time when the mark-up was created. In this example, the captured image might also be logically and digitally stored with or in this object. This captured image may be referred to as a context image and may be stored together or separate from the content of the mark-up object.

Figure 6:
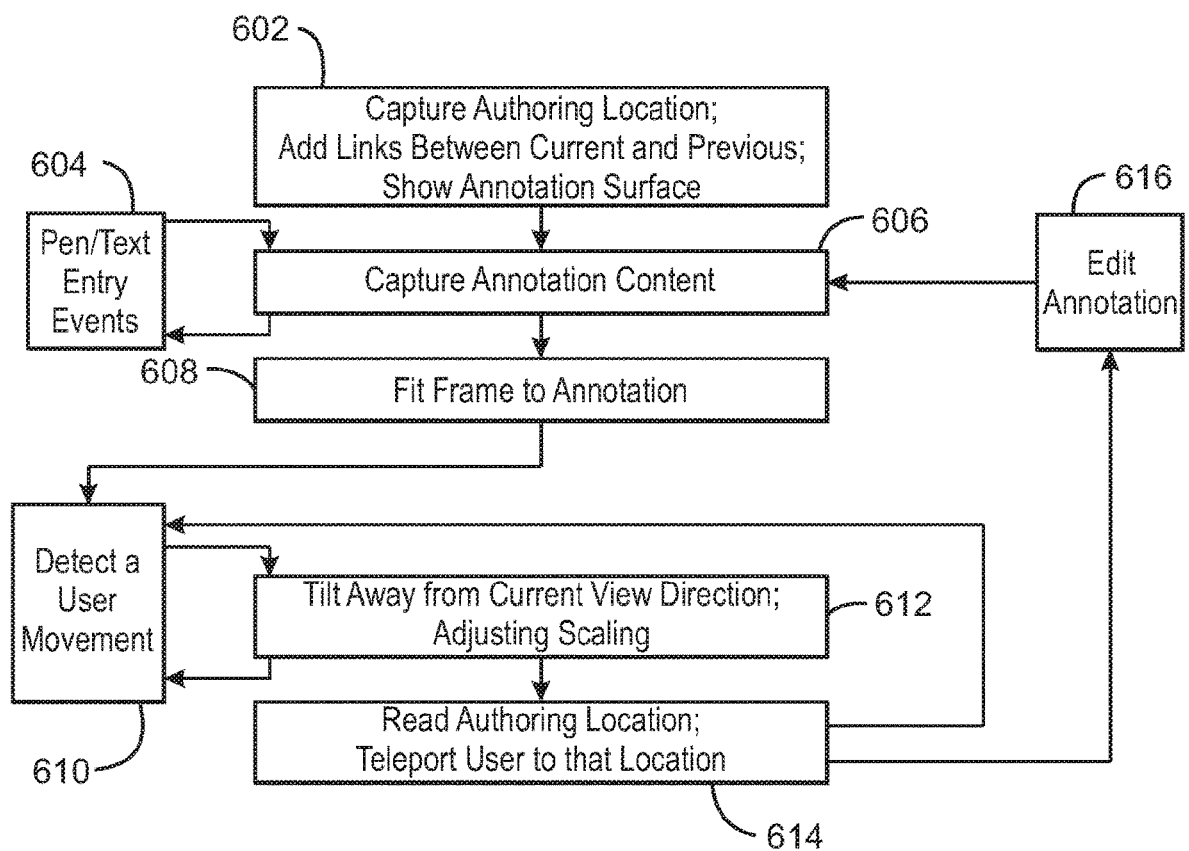
FIG. 6 is a flowchart of an example method for managing digital mark-up in a 3D environment.

FIG. 6 is a flowchart of an example method 600 for managing digital mark-up in a 3D environment. At block 602 an authoring location can be captured and stored in a mark-up object. Based on the time of capture links to current and previous mark-up objects can be added to the mark-up object. In an example, an annotation surface on the mark-up object may be displayed on the mark-up object through the display.

At block 604, annotation content can be created. The annotation surface shown from block 602 may be shown as an area for content to be created on and later displayed including text, free hand drawing, or other annotations with pre-defined symbols.

At block 606, the method 600 may be implemented to receive pen/text entry events for recording as the annotation content of block 604. The pen/text entry events 606 may repeat until the annotation content has been finalized. Once the annotation content is finished, at block 608 a frame of the mark-up object is created and fit to the annotation content, and the previously shown annotation surface removed. As discussed above, the frame may take a variety of appearances based on the annotation content of the mark-up object as well as the view shown on the display.

At block 610, a detection of a user movement can cause a change of the view being shown on the display. In response, the orientation of the mark-up object, annotation surface, and annotation content continue to tilt away from the new current view direction of the user. This can include additional change in viewpoint corresponding to the user movement detected and reflected in the view being displayed. At block 612, in in response to a view being shown on the display changing, the mark-up object, including the frame and annotation content may tilt away from the current view direction. In an example, the tilt away from the current view direction may including adjusting the scaling of and shape of the mark-up object and annotation. In an example, the view may shift due to a user moving or instructing a change in viewpoint to the display device.

At block 614, in response to a selection of the annotation through a selectable association, the view being shown may teleport or guide a view to an authoring location. In an example, the selection of the selectable association of an annotation may display first, describe, or read the authoring location prior to teleporting a user to view the first mark-up object and annotation content from the authoring location.

At block 610, a detection of a user movement occurs in response to a user moving from the authoring location. This can result in a return to block 612 where the mark-up object and annotation content tilt away from the current view direction. This tilting indicates to a user that they are not viewing the annotation from the intended authoring location. If an annotation edit is being made, instead of a detected user movement proceed to block 616

At block 616 which proceeds from block 614, a selection may be made that indicates an author or user may wish to edit the annotation. This removes the currently displayed frame from around the content and reintroduces the annotation surface, allowing the user to add content beyond the extents of the original content. This selection may return the method to block 604 where the annotation content may be edited thorough input events until the annotation content is finished.

Figure 7:
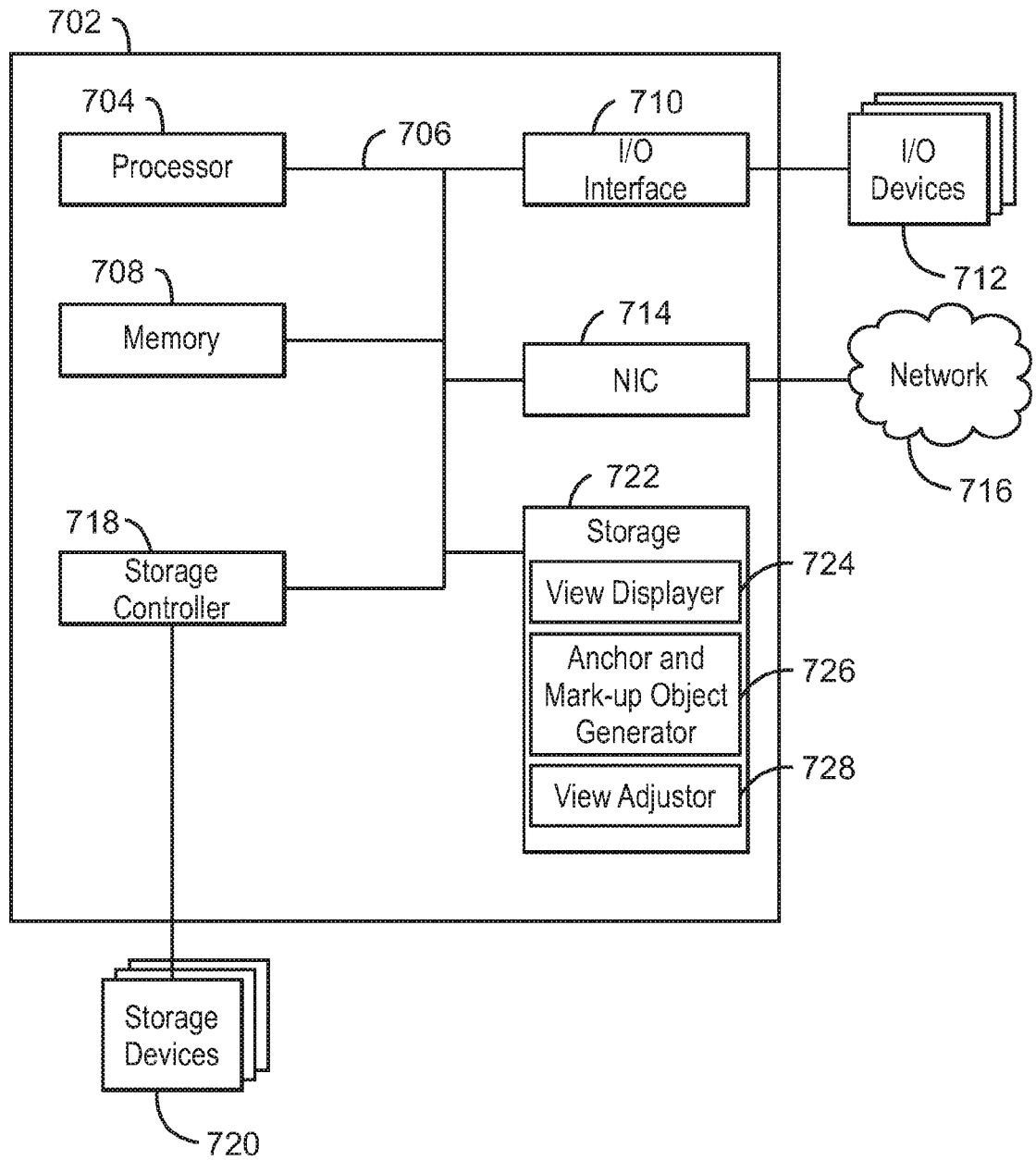
FIG. 7 is a block diagram of an example system for digital mark-up in 3D environments.

FIG. 7 is a block diagram of an example system 700 for digital mark-up in 3D environments. The system for digital mark-up in 3D environments can be computing device, including a virtual reality or augmented reality headset, glasses, or projection, as well as a desktop computer, laptop, tablet, mobile phone, smart device, or other computing devices. The system 700 for digital mark-up in 3D environments includes at least one processor 704. The processor 704 can be a single core processor, a multicore processor, a processor cluster, and the like. The processor 704 can may include a graphics processing unit (GPU), an application specific integrated circuit (ASIC), or a field programmable gate array (FPGA), or any combination thereof to implement video processing. The processor 704 can be coupled to other units through a bus 706. The bus 706 can include peripheral component interconnect (PCI) or peripheral component interconnect express (PCIe) interconnects, Peripheral Component Interconnect eXtended (PCIx), or any number of other suitable technologies for transmitting information.

The computing device 702 can be linked through the bus 706 to a memory 708. The system memory 708 can include random access memory (RAM), including volatile memory such as static random-access memory (SRAM) and dynamic random-access memory (DRAM). The system memory 708 can include directly addressable non-volatile memory, such as resistive random-access memory (RRAM), phase-change memory (PCRAM), Memristor, Magnetoresistive random-access memory, (MRAM), Spin-transfer torque Random Access Memory (STTRAM), and any other suitable memory that can be used to provide computers with persistent memory. In an example, a memory can be used to implement persistent memory if it can be directly addressed by the processor at a byte or word granularity and has non-volatile properties.

The processor 704 may be coupled through the bus 706 to an input output (I/O) interface 710. The I/O interface 710 may be coupled to any suitable type of I/O devices 712, including input devices, such as a mouse, touch screen, keyboard, display, VR/AR controllers through body movement detection cameras, handheld controllers and the like. The I/O devices 712 may be output devices such as a display, VR/AR goggles, a projector, and the like.

The computing device 702 can include a network interface controller (NIC) 714, for connecting the computing device 702 to a network 716. In some examples, the network 716 can be an enterprise server network, a storage area network (SAN), a local area network (LAN), a wide-area network (WAN), or the Internet, for example. The processor 704 can be coupled to a storage controller 718, which may be coupled to one or more storage devices 720, such as a storage disk, a solid state drive, an array of storage disks, or a network attached storage appliance, among others.

The computing device 702 can include a non-transitory, computer-readable storage media, such as a storage 722 for the long-term storage of data, including the operating system programs and user file data. The storage 722 can include local storage in a hard disk or other non-volatile storage elements. While generally system information may be stored on the storage 722, in this computing device 702, the program data can be stored in the memory 708. The storage 722 may store instructions that may be executed by the processor 704 to perform a task.

The storage 722 can include a view displayer 724 to display a view of the 3D environment on a display device. The storage 722 can include an anchor and mark-up object generator 726 that can generate, with the processor 704, an anchor point in the display device and a mark-up object associated with the anchor point, wherein the mark-up object includes mark-up dimensions. In an example, the anchor point and mark-up object are generated in response to an author input. Further the anchor point includes a virtual location relative to a first object in the 3D environment. In an example the mark-up object includes mark-up dimensions, a virtual authoring location, and a selectable association that, in response to being selected, instructs the processor to adjust the view with the view adjustor 728. In an example, the mark-up object is displayed with a first appearance in response to the view shown in the display being the view from the virtual authoring location, and wherein the mark-up object is displayed with a second appearance in response to the view shown in the display being a view from a location other than the virtual authoring location. In an example, the mark-up object further comprises an image of the background behind the mark-up object as viewed from the authoring location towards the mark-up object at the time when the mark-up content was generated. In this example, the image of the background behind the mark-up object is sent to be viewed in the display in response to a selection of a historical image toggle that is selectable on the mark-up object displayed.

The storage 722 can include a view adjustor 728 that, in response to a selectable association being selected, adjusts the view shown in the display to a view at the virtual authoring location at the time the mark-up object was authored. In an example, the adjustment of the view shown in the display comprises a sequence of views from a first virtual location to the authoring location at the time the mark-up object was authored, wherein the first virtual location corresponds a view displayed at a time the selectable association is selected. The view adjustor skips the generation and displaying of image frames of the views between a first location and the virtual author location in response to the selectable association being selected.

This system 700 can also have a storage 722 with instructions that when executed on the processor 704 generate a second anchor point in response to the author input, wherein the second anchor point includes a location relative to a second object in the 3D environment. In an example, the mark-up dimensions indicate a movement direction associated with the mark-up object, where the movement direction is located relative to the first object. In an example, this can include if an author has drawn a directional or rotational indication in the virtual space relative to the anchor point. In this case, the directional arrow or rotational indication could be misinterpreted by a viewer as a different rotational, angle, or direction unless there was a clear indication of when the viewer was viewing from the authoring location. Accordingly, the present techniques can be applied for mark-up objects that include a rotational or directional indication. In an example the mark-up object may be displayed including a selectable navigation button that when selected transports the view displayed on the display to be that of a view at a second authoring location associated with a second mark-up object, wherein the second mark-up object has been authored subsequently to the mark-up object. Further, a second mark-up object may include a selectable forward navigation button that in response to being selected transports the view displayed on the display to be that of a view at a third authoring location associated with a third mark-up object, wherein the third mark-up object has been authored subsequently to the second mark-up object, and the second mark-up object to include a selectable backwards navigation button that in response to being selected transports the view displayed on the display to be that of a view at the second authoring location associated with the second mark-up object.

It is to be understood that the block diagram of FIG. 7 is not intended to indicate that the computing device 702 is to include all of the components shown in FIG. 7. Rather, the computing device 702 can include fewer or additional components not illustrated in FIG. 7.

Figure 8:
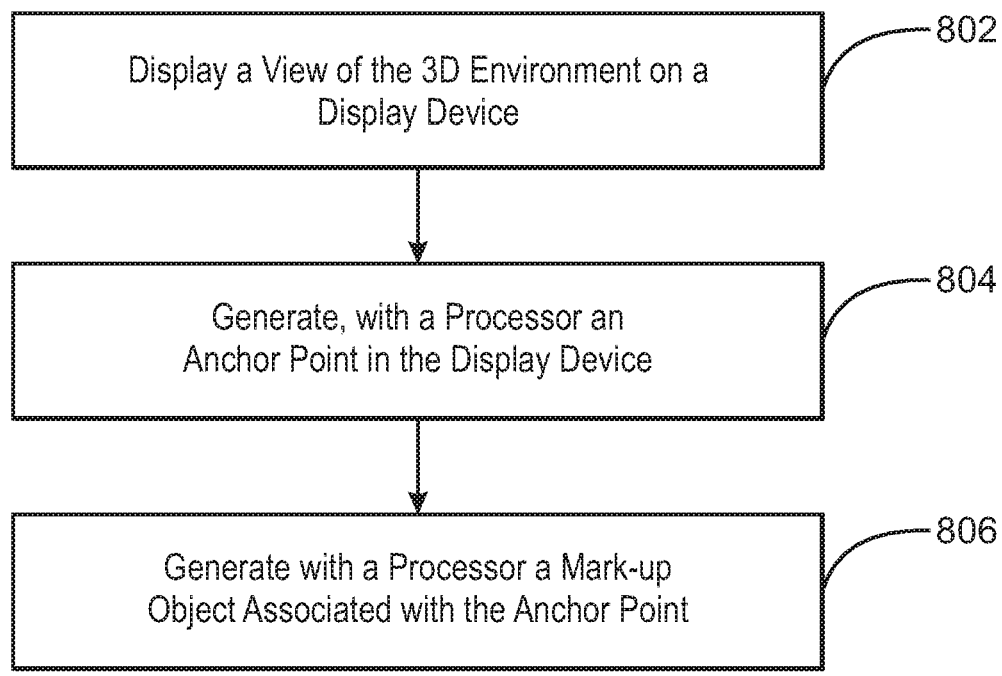
FIG. 8 is a flowchart of an example method for managing digital mark-up in 3D environments.

FIG. 8 is a flowchart of an example method for managing digital mark-up in 3D environments. At block 802, a view is displayed of the 3D environment on a display device. At block 804, a processor generates an anchor point in the display device in response to an author input, wherein the anchor point includes a virtual location relative to a first object in the 3D environment. In an example, the anchor point is generated in response to an author input. Further the anchor point includes a virtual location relative to a first object in the 3D environment.

At block 806, a processor generates a mark-up object associated with the anchor point, wherein the mark-up object includes mark-up dimensions, a virtual authoring location, and a selectable association that, in response to being selected, instructs the processor to adjust the view shown in the display at the virtual authoring location at the time the mark-up object was authored. In an example the mark-up object includes mark-up dimensions, a virtual authoring location, and a selectable association that, in response to being selected, instructs the processor to adjust the view with a view adjustor. In an example, the mark-up object is displayed with a first appearance in response to the view shown in the display being the view from the virtual authoring location, and wherein the mark-up object is displayed with a second appearance in response to the view shown in the display being a view from a location other than the virtual authoring location. In an example, the mark-up object further comprises an image of the background behind the mark-up object as viewed from the from the authoring location towards the mark-up object, captured at the time when the mark-up content was created. In this example, the image of the background behind the mark-up object is sent to be viewed in the display in response to a selection of a historical image toggle that is selectable on the mark-up object displayed.

In an example, the mark-up dimensions indicate a movement direction associated with the mark-up object, where the movement direction is located relative to the first object. In an example, this can include if an author has drawn a directional or rotational indication in the virtual space relative to the anchor point. In this case, the directional arrow or rotational indication could be misinterpreted by a viewer as a different rotational, angle, or direction unless there was a clear indication of when the viewer was viewing from the authoring location. Accordingly, the present techniques can be applied for mark-up objects that include a rotational or directional indication. In an example the mark-up object may be displayed including a selectable navigation button that when selected transports the view displayed on the display to be that of a view at a second authoring location associated with a second mark-up object, wherein the second mark-up object has been authored subsequently to the mark-up object. Further, a second mark-up object may include a selectable forward navigation button that in response to being selected transports the view displayed on the display to be that of a view at a third authoring location associated with a third mark-up object, wherein the third mark-up object has been authored subsequently to the second mark-up object, and the second mark-up object to include a selectable backwards navigation button that in response to being selected transports the view displayed on the display to be that of a view at the second authoring location associated with the second mark-up object.

It is to be understood that the block diagram of FIG. 8 is not intended to indicate that the method 800 is to include all of the actions shown in FIG. 8. Rather, the method 800 can include fewer or additional components not illustrated in FIG. 8.

Figure 9:
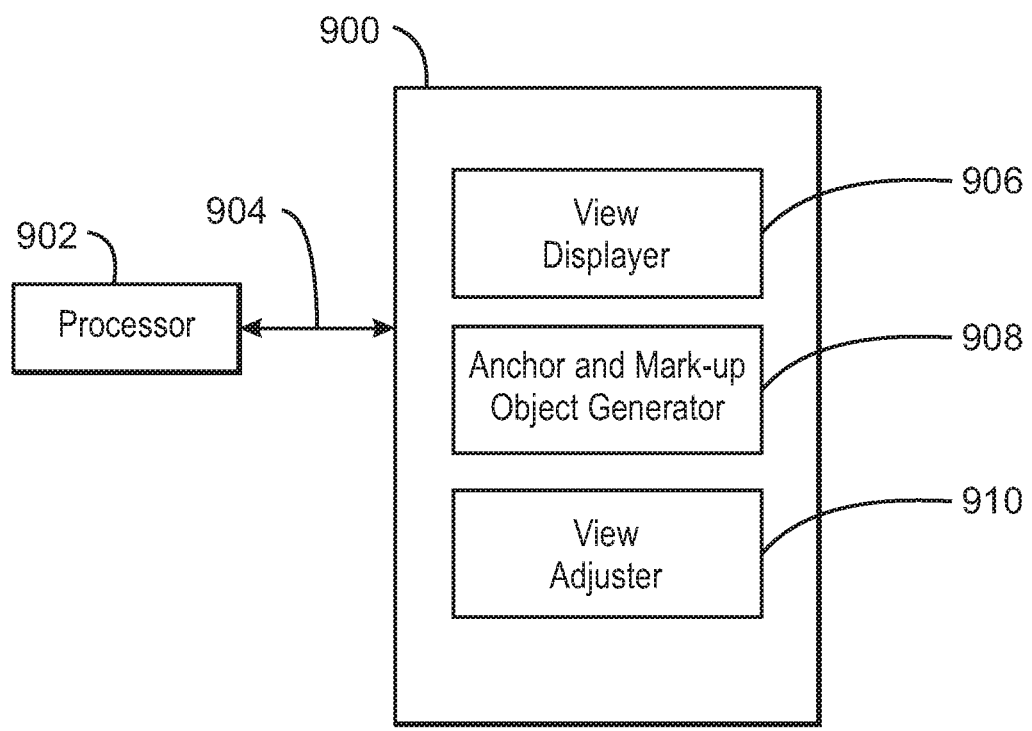
FIG. 9 is a block diagram of an example non-transitory, computer-readable medium including instructions to direct a processor to generate and manage digital mark-up in 3D environments.

FIG. 9 is a block diagram of an example non-transitory, computer-readable medium 900 including instructions to direct a processor to generate and manage digital mark-up in 3D environments. The computer readable medium 900 may include the storage 722 or the memory 708 of FIG. 7 and other suitable formats readable by the computing device. The computer readable medium 900 can include the processor 902 to execute instructions received from the computer-readable medium 900. Instructions can be stored in the computer-readable medium 900. These instructions can direct the processor 902 to generate and manage digital mark-up in 3D environments. Instructions can be communicated over a bus 904 as electrical signals, light signals, or any other suitable means of communication for transmission of data in a similar computing environment.

The computer-readable medium 900 includes a view displayer 906 to display a view of the 3D environment on a display device. The computer-readable medium 900 can include an anchor and mark-up object generator 908 that can generate, with the processor 902, an anchor point in the display device and a mark-up object associated with the anchor point, wherein the mark-up object includes mark-up dimensions. In an example, the anchor point and mark-up object are generated in response to an author input. Further the anchor point includes a virtual location relative to a first object in the 3D environment. In an example the mark-up object includes mark-up dimensions, a virtual authoring location, and a selectable association that, in response to being selected, instructs the processor to adjust the view with the view adjustor 910. In an example, the mark-up object is displayed with a first appearance in response to the view shown in the display being the view from the virtual authoring location, and wherein the mark-up object is displayed with a second appearance in response to the view shown in the display being a view from a location other than the virtual authoring location. In an example, the mark-up object further comprises an image of the background behind the mark-up object as viewed from the from the authoring location towards the mark-up object, captured at the time when the mark-up content was created. In this example, the image of the background behind the mark-up object is sent to be viewed in the display in response to a selection of a historical image toggle that is selectable on the mark-up object displayed.

The computer-readable medium 900 includes a view adjustor 910 that, in response to a selectable association being selected, adjusts the view shown in the display to a view at the virtual authoring location at the time the mark-up object was authored. In an example, the adjustment of the view shown in the display comprises a sequence of views from a first virtual location to the authoring location at the time the mark-up object was authored, wherein the first virtual location corresponds a view displayed at a time the selectable association is selected. The view adjustor skips the generation and displaying of image frames of the views between a first location and the virtual author location in response to the selectable association being selected.

This computer-readable medium 900 can also store instructions that when executed on the processor 902 generate a second anchor point in response to the author input, wherein the second anchor point includes a location relative to a second object in the 3D environment. In an example, the mark-up dimensions indicate a movement direction associated with the mark-up object, where the movement direction is located relative to the first object. In an example, this can include if an author has drawn a directional or rotational indication in the virtual space relative to the anchor point. In this case, the directional arrow or rotational indication could be misinterpreted by a viewer as a different rotational, angle, or direction unless there was a clear indication of when the viewer was viewing from the authoring location. Accordingly, the present techniques can be applied for mark-up objects that include a rotational or directional indication. In an example the mark-up object may be displayed including a selectable navigation button that when selected transports the view displayed on the display to be that of a view at a second authoring location associated with a second mark-up object, wherein the second mark-up object has been authored subsequently to the mark-up object. Further, a second mark-up object may include a selectable forward navigation button that in response to being selected transports the view displayed on the display to be that of a view at a third authoring location associated with a third mark-up object, wherein the third mark-up object has been authored subsequently to the second mark-up object, and the second mark-up object to include a selectable backwards navigation button that in response to being selected transports the view displayed on the display to be that of a view at the second authoring location associated with the second mark-up object.

It is to be understood that the block diagram of FIG. 9 is not intended to indicate that the computer-readable medium 900 is to include all of the components shown in FIG. 9. Rather, the computer-readable medium 900 can include fewer or additional components not illustrated in FIG. 9.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. A device for digital mark-up in a three-dimensional (3D) environment comprising:
   a processor;
   a display for showing a first view of the 3D environment, wherein the 3D environment comprises an augmented reality tied to a physical location;
   a memory including instructions that when executed on the processor generate:
   an anchor point in response to an author input, wherein the anchor point includes a virtual location relative to a first object in the 3D environment, wherein the anchor point defines a two-dimensional (2D) plane in the 3D environment that is parallel to a plane of the display; and
   a mark-up object associated with the anchor point, wherein the mark-up object is generated on the 2D plane, and wherein the mark-up object includes mark-up dimensions, a virtual authoring location, and a selectable association that, in response to being selected, instructs the processor to adjust the first view shown in the display to be a second view different from the first view while rotating the 2D plane through the anchor point, wherein the second view corresponds to a point of view from the virtual authoring location at a time the mark-up object was authored.

2. The device of claim 1, wherein the adjustment of the first view shown in the display comprises a sequence of views from a first virtual location to the virtual authoring location at the time the mark-up object was authored, wherein the first virtual location corresponds the first view displayed at a time the selectable association is selected.

3. The device of claim 1, wherein the mark-up object is displayed with a first appearance in response to a current view shown in the display being the second view from the virtual authoring location, and wherein the mark-up object is displayed with a second appearance in response to the current view shown in the display being another view from a location other than the virtual authoring location.

4. The device of claim 1, wherein the mark-up object further comprises an image of a background behind the mark-up object as viewed from the virtual authoring location towards the mark-up object, captured at the time when the mark-up object was created.

5. The device of claim 4, wherein the image of the background behind the mark-up object is sent to be viewed in the display in response to a selection of a historical image toggle that is selectable on the mark-up object displayed.

6. The device of claim 1, comprising instructions that when executed on the processor generate a second anchor point in response to the author input, wherein the second anchor point includes a location relative to a second object in the 3D environment.

7. The device of claim 1, wherein the mark-up dimensions indicate a movement direction associated with the mark-up object, where the movement direction is located relative to the first object.

8. The device of claim 1, comprising instructions that when executed on the processor skip the generation and displaying of image frames of one or more views between a first location and the virtual author location in response to the selectable association being selected.

9. The device of claim 1, wherein the mark-up object includes a selectable navigation button that when selected transports the first view displayed on the display to be that of a third view at a second authoring location associated with a second mark-up object, wherein the second mark-up object has been authored subsequently to the mark-up object.

10. The device of claim 9, wherein the second mark-up object includes a selectable forward navigation button that in response to being selected transports the first view displayed on the display to be that of a fourth view at a third authoring location associated with a third mark-up object, wherein the third mark-up object has been authored subsequently to the second mark-up object, and the second mark-up object to include a selectable backwards navigation button that in response to being selected transports the view displayed on the display to be that of a view at the second authoring location associated with the second mark-up object.

11. The device of claim 1, wherein the first view has a first orientation and the second view has a second orientation different from the first orientation.

12. The device of claim 1, wherein the first view is associated with a first set of 3D coordinates and the second view is associated with a second set of 3D coordinates, wherein at least one coordinate value of the first set of 3D coordinates is different from at least one coordinate value of the second set of 3D coordinates.

13. The device of claim 1, wherein the virtual authoring location includes a coordinate location in virtual dimensions of the 3D environment and an orientation in the 3D environment from which the mark-up object was authored.

14. The device of claim 1, wherein the mark-up dimensions include a coordinate location in the 3D environment and an orientation relative to the first object for the mark-up object.

15. A method for digital mark-up in a three-dimensional (3D) environment comprising:
displaying a first view of the 3D environment on a display device, wherein the 3D environment comprises an augmented reality tied to a physical location; and
generating, with a processor:
an anchor point in the display device in response to an author input, wherein the anchor point includes a virtual location relative to a first object in the 3D environment wherein the anchor point defines a two-dimensional (2D) plane in the 3D environment that is parallel to a plane of the display; and
a mark-up object associated with the anchor point, wherein the mark-up object is generated on the 2D plane, and wherein the mark-up object includes mark-up dimensions, a virtual authoring location, and a selectable association that, in response to being selected, instructs the processor to adjust the first view shown in the display to be a second view different from the first view while rotating the 2D plane through the anchor point, wherein the second view corresponds to a point of view from the virtual authoring location at a time the mark-up object was authored.

16. The method of claim 15, wherein the adjustment of the first view shown on the display device comprises a sequence of views from a first virtual location to the virtual authoring location at the time the mark-up object was authored, wherein the first virtual location corresponds the first view displayed at the time the selectable association is selected.

17. The method of claim 15, wherein the mark-up object is displayed with a first appearance in response to a current view shown on the display device being the second view from the virtual authoring location, and wherein the mark-up object is displayed with a second appearance in response to the current view shown on the display device being another view from a location other than the virtual authoring location.

18. A non-transitory computer-readable medium for digital mark up in a three-dimensional (3D) environment comprising instructions which, in response to execution on a processor, cause the processor to:
display a first view of the 3D environment on a wearable display device, wherein the 3D environment comprises an augmented reality tied to a physical location;
generate an anchor point in response to an author input, wherein the anchor point includes a virtual location relative to a first object in the 3D environment, wherein the anchor point defines a two-dimensional (2D) plane in the 3D environment that is parallel to a plane of the display; and
generate a mark-up object associated with the anchor point, wherein the mark-up object is generated on the 2D plane, and wherein the mark-up object includes mark-up dimensions, a virtual authoring location, and a selectable association that, in response to being selected, instructs the processor to adjust the first view shown in the display to be a second view different from the first view while rotating the 2D plane through the anchor point, wherein the second view corresponds to a point of view from the virtual authoring location at a time the mark-up object was authored.

19. The non-transitory computer-readable medium for digital mark-up in a three-dimensional (3D) environment of claim 18, wherein the adjustment of the first view shown in the display comprises a sequence of views showing movement from a first virtual location to the virtual authoring location at the time the mark-up object was authored, wherein the first virtual location corresponds the second view displayed at the time the selectable association is selected.

* * * * *